United States Patent
Liu et al.

(10) Patent No.: US 11,573,679 B2
(45) Date of Patent: Feb. 7, 2023

(54) INTEGRATION OF USER EMOTIONS FOR A SMARTPHONE OR OTHER COMMUNICATION DEVICE ENVIRONMENT

(71) Applicant: The California State University, Northridge, Northridge, CA (US)

(72) Inventors: Li Liu, Northridge, CA (US); Dragos Guta, Northridge, CA (US)

(73) Assignee: The Trustees of the California State University, Long Beach, CA (US)

( * ) Notice: Subject to any disclaimer, the term of this patent is extended or adjusted under 35 U.S.C. 154(b) by 0 days.

(21) Appl. No.: 16/398,656

(22) Filed: Apr. 30, 2019

(65) Prior Publication Data

US 2019/0332247 A1 Oct. 31, 2019

Related U.S. Application Data

(60) Provisional application No. 62/664,840, filed on Apr. 30, 2018.

(51) Int. Cl.
*G06F 3/0482* (2013.01)
*G06F 3/04817* (2022.01)
*G06F 3/01* (2006.01)

(52) U.S. Cl.
CPC ......... *G06F 3/04817* (2013.01); *G06F 3/011* (2013.01); *G06F 3/0482* (2013.01); *G06F 2203/011* (2013.01)

(58) Field of Classification Search
CPC .............. G06F 3/011; G06F 3/0482; G06F 2203/011; G06F 9/451; H04M 2250/52
See application file for complete search history.

(56) References Cited

U.S. PATENT DOCUMENTS

| | | | | |
|---|---|---|---|---|
| 6,545,682 | B1* | 4/2003 | Ventrella | G06F 3/011 345/473 |
| 8,588,825 | B2* | 11/2013 | Jonsson | G10L 17/26 455/466 |
| 9,383,819 | B2* | 7/2016 | Mullins | G06T 19/006 |
| 9,690,767 | B2* | 6/2017 | Leydon | G06F 3/0238 |
| 9,830,728 | B2* | 11/2017 | Fang | G06T 5/002 |

(Continued)

*Primary Examiner* — Phenuel S Salomon
(74) *Attorney, Agent, or Firm* — Sandra Poteat Thompson; Finlayson Toffer (57) ABSTRACT

Methods of real-time emoji and emoticon production are disclosed that include: determining, by a computing device, at least one first emotional state of a user from information, wherein the at least one first emotional state is a presently-identified emotional state of the user; providing an emoji or emoticon production template system, wherein the template system includes at least one physical attribute of the user; and utilizing the emoji or emoticon production template system to: analyze the presently-identified emotional state of the user; determine a suitable map of the presently-identified state of the user; map the presently-identified state of the user on an emoji or emoticon production template; produce at least one unique emoji or emoticon based on the map; provide the at least one unique emoji or emoticon to the user, wherein the user selects the at least one unique emoji or emoticon and includes the at least one unique emoji or emoticon in a text message, a direct message, an electronic mail message, or a combination thereof.

7 Claims, 6 Drawing Sheets

(56) References Cited

U.S. PATENT DOCUMENTS

| | | | |
|---|---|---|---|
| 9,996,940 B1* | 6/2018 | Yamasaki | G06T 11/00 |
| 10,628,985 B2* | 4/2020 | Mishra | G10L 15/005 |
| 2001/0033675 A1* | 10/2001 | Maurer | G06K 9/00248 |
| | | | 382/103 |
| 2005/0156873 A1* | 7/2005 | Walter | H04L 51/04 |
| | | | 345/156 |
| 2007/0104369 A1* | 5/2007 | Weatherhead | G06Q 30/0242 |
| | | | 382/181 |
| 2008/0309675 A1* | 12/2008 | Fleury | G06T 17/00 |
| | | | 345/581 |
| 2010/0141663 A1* | 6/2010 | Becker | G06T 13/80 |
| | | | 345/473 |
| 2012/0278064 A1* | 11/2012 | Leary | G06F 40/253 |
| | | | 704/9 |
| 2012/0329561 A1* | 12/2012 | Evans | A63F 13/63 |
| | | | 463/43 |
| 2013/0159919 A1* | 6/2013 | Leydon | G06F 3/04812 |
| | | | 715/780 |
| 2014/0088954 A1* | 3/2014 | Shirzadi | G06F 16/353 |
| | | | 704/9 |
| 2014/0379328 A1* | 12/2014 | Kim | G06F 40/274 |
| | | | 704/9 |
| 2015/0248424 A1* | 9/2015 | Berube | G06F 16/93 |
| | | | 715/234 |
| 2016/0005206 A1* | 1/2016 | Li | G06K 9/00268 |
| | | | 345/474 |
| 2016/0042548 A1* | 2/2016 | Du | G06T 7/251 |
| | | | 345/473 |
| 2016/0259502 A1* | 9/2016 | Parrott | G06F 3/04817 |
| 2016/0261675 A1* | 9/2016 | Block | G06F 3/0481 |
| 2017/0060354 A1* | 3/2017 | Luo | H04M 1/72436 |
| 2017/0075878 A1* | 3/2017 | Jon | H04M 1/72436 |
| 2017/0083506 A1* | 3/2017 | Liu | G06F 40/166 |
| 2017/0098122 A1* | 4/2017 | El Kaliouby | G16H 50/30 |
| 2017/0308293 A1* | 10/2017 | Lee | G06F 3/04845 |
| 2017/0310927 A1* | 10/2017 | West | G06K 9/00302 |
| 2017/0358117 A1* | 12/2017 | Goossens | H04L 51/10 |
| 2018/0047200 A1* | 2/2018 | O'Hara | G06T 3/40 |
| 2018/0081515 A1* | 3/2018 | Block | G06F 3/0481 |
| 2018/0095606 A1* | 4/2018 | Chae | H04L 51/32 |
| 2018/0107279 A1* | 4/2018 | Pirzadeh | G06F 3/04883 |
| 2018/0331839 A1* | 11/2018 | Gao | G06Q 10/107 |
| 2018/0335930 A1* | 11/2018 | Scapel | H04L 51/10 |
| 2018/0336714 A1* | 11/2018 | Stoyles | G11B 27/036 |
| 2018/0336715 A1* | 11/2018 | Rickwald | G06K 9/00315 |
| 2019/0079644 A1* | 3/2019 | Kim | G10L 13/00 |
| 2019/0139287 A1* | 5/2019 | Weise | G06T 13/40 |
| 2019/0147043 A1* | 5/2019 | Moskowitz | A61B 5/0531 |
| | | | 704/9 |
| 2019/0180084 A1* | 6/2019 | Bouaziz | G06K 9/00281 |
| 2019/0228552 A1* | 7/2019 | Lee | G06T 11/60 |
| 2019/0279410 A1* | 9/2019 | Orvalho | G06F 3/013 |
| 2020/0201540 A1* | 6/2020 | Zambetti | G06F 3/04886 |

* cited by examiner

A method 500 of real-time emoji and emoticon production includes:

↓ determining 510, by a computing device, at least one first emotional state of a user from information other than text inputted by the user on the computing device, wherein the at least one first emotional state is a presently-identified emotional state of the user

↓ providing 520 an emoji or emoticon production template system, wherein the template system includes at least one physical attribute of the user; and

↓ utilizing 530 the emoji or emoticon production template system to:

↓ analyze 540 the presently-identified emotional state of the user

↓ determine 550 a suitable map of the presently-identified state of the user

↓ map 560 the presently-identified state of the user on an emoji or emoticon production template

↓ produce 570 at least one unique emoji or emoticon based on the map; and

↓ provide 580 the at least one unique emoji or emoticon to the user, wherein the user selects the at least one unique emoji or emoticon and includes the at least one unique emoji or emoticon in a text message, a direct message, an electronic mail message, or a combination thereof.

Fig. 5

```
┌─────────────────────────────────────────────────────────────────────────────┐
│ Another method 600 of real-time emoji and emoticon production includes:     │
└─────────────────────────────────────────────────────────────────────────────┘
                                     ↓
┌─────────────────────────────────────────────────────────────────────────────┐
│ determining 610, by a computing device, at least one first emotional state  │
│ of a user from information other than text inputted by the user on the      │
│ computing device, wherein the at least one first emotional state is a       │
│ presently-identified emotional state of the user                            │
└─────────────────────────────────────────────────────────────────────────────┘
                                     ↓
┌─────────────────────────────────────────────────────────────────────────────┐
│ providing 620 an emoji or emoticon production template system, wherein the  │
│ template system includes at least one physical attribute of the user        │
└─────────────────────────────────────────────────────────────────────────────┘
                                     ↓
┌─────────────────────────────────────────────────────────────────────────────┐
│ determining 630, by the computing device, at least one second emotional     │
│ state of a user from text inputted by the user on the computing device,     │
│ wherein the at least one second emotion state is a textually-identified     │
│ emotional state of the user                                                 │
└─────────────────────────────────────────────────────────────────────────────┘
                                     ↓
┌─────────────────────────────────────────────────────────────────────────────┐
│ utilizing 640 the emoji or emoticon production template system to:          │
└─────────────────────────────────────────────────────────────────────────────┘
                                     ↓
    ┌─────────────────────────────────────────────────────────────────────┐
    │ analyze 645 the presently-identified emotional state of the user    │
    └─────────────────────────────────────────────────────────────────────┘
                                     ↓
    ┌─────────────────────────────────────────────────────────────────────┐
    │ analyze 650 the textually-identified emotional state of the user    │
    └─────────────────────────────────────────────────────────────────────┘
                                     ↓
    ┌─────────────────────────────────────────────────────────────────────┐
    │ determine 655 a suitable map of the presently-identified state of   │
    │ the user                                                            │
    └─────────────────────────────────────────────────────────────────────┘
                                     ↓
    ┌─────────────────────────────────────────────────────────────────────┐
    │ determine 660 a suitable map of the textually-identified emotional  │
    │ state of the user                                                   │
    └─────────────────────────────────────────────────────────────────────┘
                                     ↓
    ┌─────────────────────────────────────────────────────────────────────┐
    │ map 665 the presently-identified state of the user on an emoji or   │
    │ emoticon production template                                        │
    └─────────────────────────────────────────────────────────────────────┘
                                     ↓
```

INTEGRATION OF USER EMOTIONS FOR A SMARTPHONE OR OTHER COMMUNICATION DEVICE ENVIRONMENT

This United States Utility Application claims priority to U.S. Provisional Application Ser. No. 62/664,840 entitled "Integration of User Emotions for a Smartphone or Other Communication Device Environment", which was filed on Apr. 30, 2018 and which is commonly-owned and incorporated herein in its entirety by reference.

FIELD OF THE SUBJECT MATTER

The subject matter is related to the integration of user emotions for a computing device, which may be a smartphone or another communication device environment.

BACKGROUND

It is not unusual to see that everyone around us has a smart device within arm's reach distance, especially how ubiquitous and pervasive computing is the world. With the advent of manufacturing technologies in the effort to make devices smaller, more powerful and more portable, people now bring their network-enabled portable devices with them wherever they go making it possible for users to communicate with each other anywhere and at any time.

The way we communicate with each other through technology has pushed human communication technologies into the fourth era [13]. Text messaging, as a popular form of computer-mediated communication (CMC), does permeate not only our professional lives, but also our personal lives connecting us with diverse groups of individuals and keeping us in touch with people we know.

Software, such as iMessage, WhatsApp, and WeChat, further enhances messaging features and increases the popularity of smart phones, by expanding the reach of text message communication beyond the borders of standard cellular towers. Additionally, social media applications are frequently used for sending text-based messages. A high amount of Internet users, 76 percent across 40 different countries, use some form of social media such as Facebook, Twitter, Instagram, and Snapchat [19], and there is a big appetite for text messaging globally.

Computer-mediated communication (CMC) faces the challenge of understanding the content correctly because of the disruptive nature of messages [2]. In the traditional face-to-face communication, a person attempts to relate to another person intimately on a comfortable level [16], but the communication channel is not limited to speaking, writing, and gesturing. The complex process involves emotional information such as emojis to represent affection status [8], which adds richness to communication and increases the chance of accurate interpretation. Although we are not confined to communications in a face-to-face mode today, we miss contextual information from the other person(s) in the conversation and the tone of the other person(s) in the conversation, as discussed in the semiotic theory of Charles Sanders Peirc [17], while using CMC.

Research in both linguistic and anthropology suggests that gesture, voice, expression, and context add richness to communications that increase the chances of accurate interpretation [1]. However, communicating via instant text messaging strips out much of this richness, leading readers to impose their own richness. Many researchers have noted the importance of nonverbal cues to understanding the meaning and nature of the message in face-to-face [8] [9]. This lack of contextual information has been blamed for causing electronic message recipients to perceive the senders of those messages as behaving rudely and offensively [22] or just missing the point of the message altogether.

As defined, smart phones are hand held mobile operating systems with integrated broadband cellular networks. Their primary feature is communication through text messaging and audio phone calls. In recent times, the ownership of smart phones has increased, as well as the reliance on digital communication through text messages. However, as mentioned earlier, text-based conversations are often lacking in information that would otherwise be available in face to face contact resulting in an inadequate form of communication. Information such as social cues, mood, feelings, or attitude are not available. As such, understanding the affective state of a partner will produce a more meaningful and detailed conversation via text messaging.

Text messaging has become one of the indispensable communication tools today. It has changed the way users efficiently communicate with each other and perceive information. Emojis play an imperative role in attempting to deliver emotional information in text messaging. They complement texts, but are more flexible in expression, to describe a user's sentiment that are hard to be described by words. Emojis are traditionally selected through picking emoji icons from a list and sent through the chat box. However, as picking an emotion icon does not involve assessing one's actual feeling, people may choose and send the emojis without awareness of one's own actual emotion—leading to potential false picking or inaccurate emotion delivery.

To increase the thoughtfulness of emojis use one technique is incorporating facial expressions of emotion. The increased self-awareness could lead to more assessment of internal feeling and encourage selecting the emojis with attention. This study compares three manners of emoji selection techniques on mobile and evaluate how the self-awareness affects emotion expression in text messaging. The preliminary result shows that higher self-awareness leads to increased thoughtfulness in expressing emotions and boosts the accuracy of emojis selection based on a user's current mood.

The use of emoji is one of the attempts to enrich non-text information in CMC. The difficulty for readers to tell the difference between jokes and serious posts on a Carnegie Mellon University digital message board in the early 1980s inspired Scott Fahlman to add special symbol :-) to denote humorous posts and add the symbol :-(to serious ones. So, readers can read it sideways and have a more comprehensive understanding of the contents. The adoption of special symbols later leaded to the development of a visual representation of emotions such as emoticon [18]. An emoticon is a set of pictorial representation of facial expressions using punctuation marks, numbers, and letters to express feelings or moods. As more computers and electronic devices transition to Unicode, a larger set of visual representation of emotions, objects, and symbols, called "emoji", were incorporated to serve as emotion indicators [20].

Both emoticon and emoji reinforce communication by providing alternatives to text, adding a higher level of flexibility in manipulating affection. Sending moods and emotions by emojis only requires picking icons from the list, increasing their possibility to be false-picked or with careless. On the other hand, the recipient interprets sender's affection through emojis, and emojis that are not selected carefully may not accurately reflect sender's actual mood states and may cause communication problems.

U.S. Pat. No. 9,665,567 issued to Liu et al. discloses suggesting to the user/communicator emoji characters based on the current contextual emotional state of the user. So, this work moves the ball forward to some extent on helping to make communications more related to actual feelings and emotions of the user. As an example, this patent discloses using the current text imputed by the user in combination with the current perceived emotional state of the user to pick and then suggest a related emoji from the list of standard emoji. The user can then select whether to incorporate that emoji and which emoji to incorporate in the user's text message or direct message. In other words, this patent has two prongs: 1) the invention disclosed therein can suggest a related emoji based on the user's emotional state, and then the user can select whether to incorporate that emoji (or which emoji) to incorporate into the user's text or direct message; or 2) pick an emoji based on the user's emotional state and insert it into the CMC. In this patent, however, there is no opportunity to utilize emojis other than the ones currently available, thereby, not allowing the user to fully communicate his or her mood, context, or other emotion that is behind the text or direct message.

As such, what is needed is an application that establishes the current mood, emotion, and general attitude (also referred to as affective state) of both conversational partners and allows a level of emotional expression flexibility that is not currently seen in conventional disclosures and applications.

SUMMARY OF THE SUBJECT MATTER

Methods of real-time emoji and emoticon production are disclosed that include: determining, by a computing device, at least one first emotional state of a user from information other than text inputted by the user on the computing device, wherein the at least one first emotional state is a presently-identified emotional state of the user; providing an emoji or emoticon production template system, wherein the template system includes at least one physical attribute of the user; and utilizing the emoji or emoticon production template system to: analyze the presently-identified emotional state of the user; determine a suitable map of the presently-identified state of the user; map the presently-identified state of the user on an emoji or emoticon production template; produce at least one unique emoji or emoticon based on the map; provide the at least one unique emoji or emoticon to the user, wherein the user selects the at least one unique emoji or emoticon and includes the at least one unique emoji or emoticon in a text message, a direct message, an electronic mail message, or a combination thereof.

Methods of real-time emoji and emoticon production are also disclosed that include: determining, by a computing device, at least one first emotional state of a user from information other than text inputted by the user on the computing device, wherein the at least one first emotional state is a presently-identified emotional state of the user; providing an emoji or emoticon production template system, wherein the template system includes at least one physical attribute of the user; determining, by the computing device, at least one second emotional state of a user from text inputted by the user on the computing device, wherein the at least one second emotion state is a textually-identified emotional state of the user; utilizing the emoji or emoticon production template system to: analyze the presently-identified emotional state of the user; analyze the textually-identified emotional state of the user; determine a suitable map of the presently-identified state of the user; determine a suitable map of the textually-identified emotional state of the user; map the presently-identified state of the user on an emoji or emoticon production template; add the textually-identified emotional state of the user on the emoji or emoticon production template map; produce at least one unique emoji or emoticon based on the map; provide the at least one unique emoji or emoticon to the user, wherein the user selects the at least one unique emoji or emoticon and includes the at least one unique emoji or emoticon in a text message, a direct message, an electronic mail message, or a combination thereof.

DETAILED DESCRIPTION

As stated in the background, what is needed is an application that establishes and provides the current mood, emotion, and general attitude (also referred to as affective state) of at least one of the conversational partners, and in some embodiments both conversational partners, and allows a level of emotional expression flexibility that is not currently seen in conventional disclosures and applications. This deficiency in conventional state-of-the-art systems has been addressed by current work disclosed herein.

Specifically, a novel system and process has been developed that can identify the affective state of its user as well as provide the mechanism to transmit and represent that state through the use of emoji that are developed in real time based on the look, emotional state, and choice of the user. Mobile smart phone applications, capable of capturing and identifying emotion and providing characterizations of emotion, are disclosed and described herein. Methods of the sending of the characterizations via the underlying messaging framework provided by the smart phone are also disclosed and described herein. In order to overcome the lack of social cues and other information in digital communication, a contemplated smart phone application, which may be referred to as "emoji", identifies the current emotion of the user and provides several characterizations to facilitate a more meaningful and interactive conversation.

Figure 5:
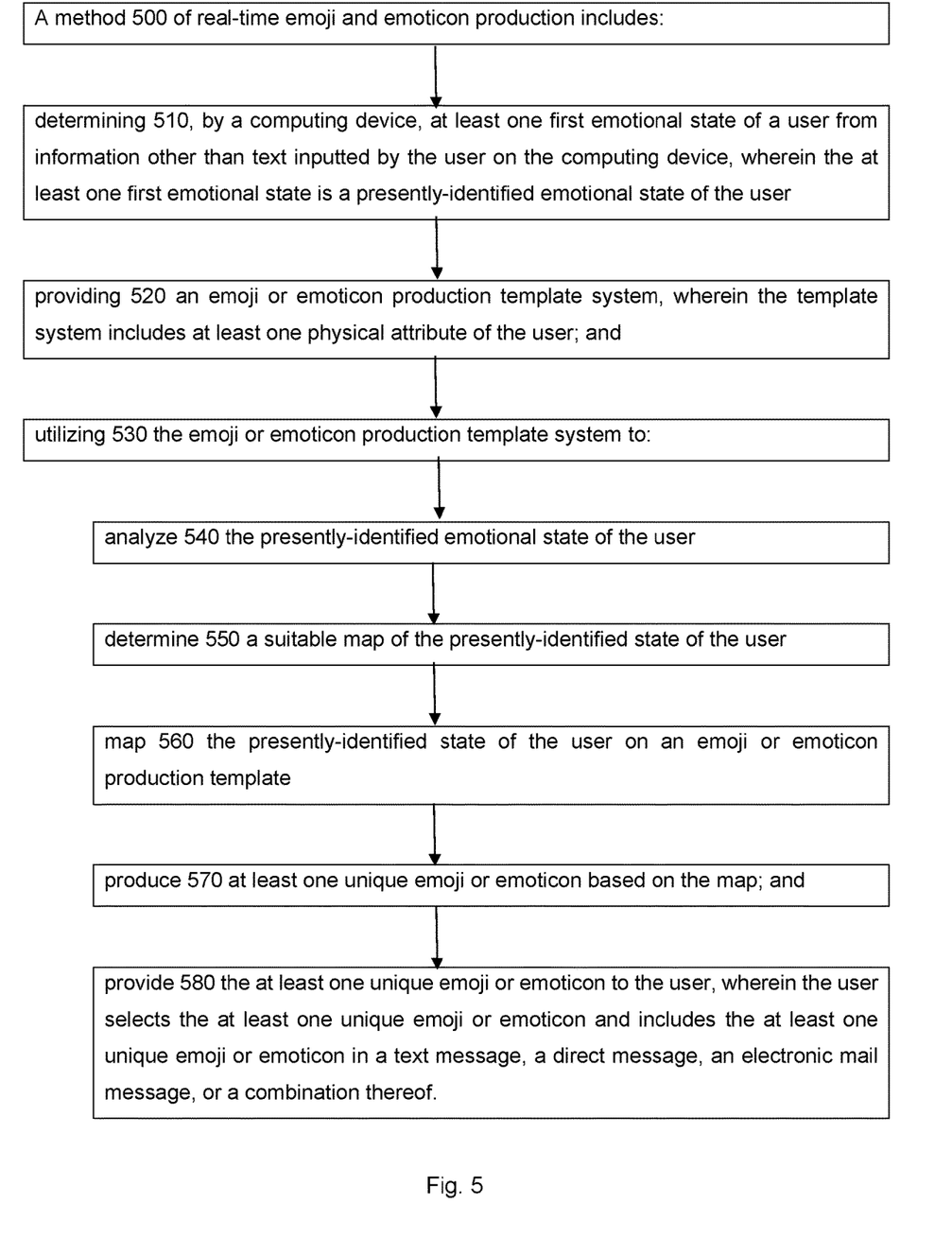
FIG. 5 shows a contemplated method.

Contemplated methods 500 of real-time emoji and emoticon production are disclosed and shown in FIG. 5 that include: determining 510, by a computing device, at least one first emotional state of a user from information other than text inputted by the user on the computing device, wherein the at least one first emotional state is a presently-identified emotional state of the user; providing 520 an emoji or emoticon production template system, wherein the template system includes at least one physical attribute of the user; and utilizing 530 the emoji or emoticon production template system to: analyze 540 the presently-identified emotional state of the user; determine 550 a suitable map of the presently-identified state of the user; map 560 the presently-identified state of the user on an emoji or emoticon production template; produce 570 at least one unique emoji or emoticon based on the map; and provide 580 the at least one unique emoji or emoticon to the user, wherein the user selects the at least one unique emoji or emoticon and includes the at least one unique emoji or emoticon in a text message, a direct message, an electronic mail message, or a combination thereof.

Figure 6:
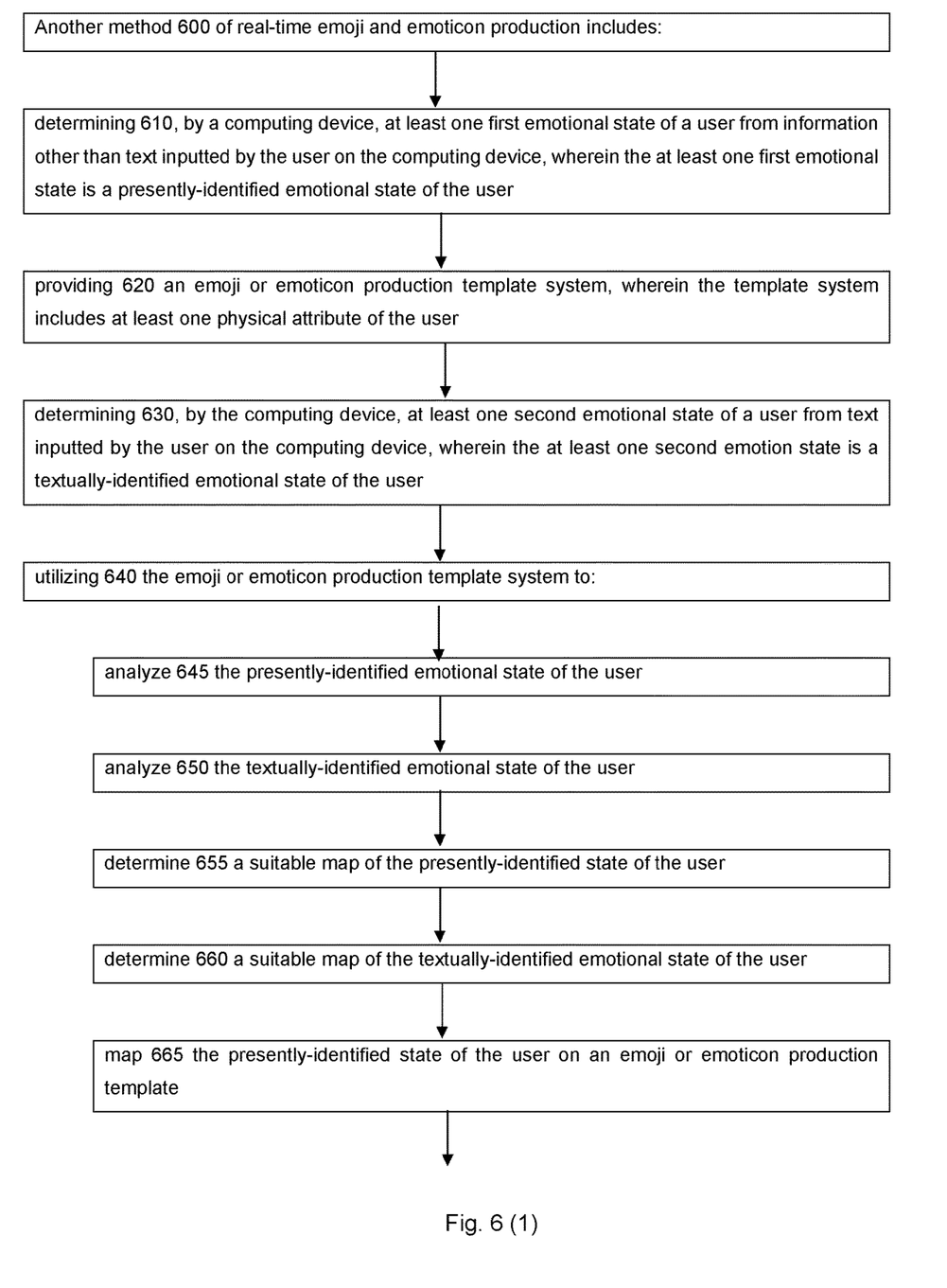
FIG. 6 shows a contemplated method.

Additional contemplated methods 600 of real-time emoji and emoticon production are shown in FIG. 6 and also disclosed that include: determining 610, by a computing device, at least one first emotional state of a user from information other than text inputted by the user on the computing device, wherein the at least one first emotional state is a presently-identified emotional state of the user; providing 620 an emoji or emoticon production template system, wherein the template system includes at least one physical attribute of the user; determining 630, by the computing device, at least one second emotional state of a user from text inputted by the user on the computing device, wherein the at least one second emotion state is a textually-identified emotional state of the user; utilizing 640 the emoji or emoticon production template system to: analyze 645 the presently-identified emotional state of the user; analyze 650 the textually-identified emotional state of the user; determine 655 a suitable map of the presently-identified state of the user; determine 660 a suitable map of the textually-identified emotional state of the user; map 665 the presently-identified state of the user on an emoji or emoticon production template; add 670 the textually-identified emotional state of the user on the emoji or emoticon production template map; produce 675 at least one unique emoji or emoticon based on the map; provide 680 the at least one unique emoji or emoticon to the user, wherein the user selects the at least one unique emoji or emoticon and includes the at least one unique emoji or emoticon in a text message, a direct message, an electronic mail message, or a combination thereof.

A visual representation, such as emoji, is not labeled, so its meaning depends on those who use them. People who receive text messages have very little to help discern what the sender is trying to convey in the absence of other cues such as facial expression, tone of voice or body gesture [5]. Without this clarifying information, a recipient frequently "fill in the blanks" with his or her customary emotions, such as worries and assumptions [10]. This is why it is uncommon to feel an instant heated wave of irritation, disregarded or even hurt by just reading these cryptic electronic (sometimes are very short) messages, a person receives. As a consequence, what the recipient believes is being said may have little relevance or little to do with what the sender has wished to communicate because these short text messages are get shaped by the recipient's feelings and expectations.

CMC techniques that allow seeing oneself increase self-awareness during communication (see [14] for a review). Presenting a camera of the user or disclosing one's identity raise awareness of self, which leads to more consideration and manipulation of the behaviors [12]. Prior studies suggest that when a mirror or a camera is presented, the user often self-identifies "self" as an object to be evaluated and adjusted [6]. Being aware of oneself drives users to become more involved in the interaction and reduces potential false actions [7] and negative emotions [11]. Self-awareness has been widely used to encourage users to adjust interaction, such as correcting output from machine learning [15] and tracking cursor movement [21]. Contemplated embodiments incorporate a common technique—front camera on smartphones—to increase self-awareness level when selecting emojis. Facial expression is recognized to assist identifying a user's expression.

Contemplated embodiments real-time emoji and emoticon production includes: determining, by a computing device, at least one first emotional state of a user from information other than text inputted by the user on the computing device, wherein the at least one first emotional state is a presently-identified emotional state of the user. As contemplated herein, the determining step involves or includes utilizing the camera, voice recorder, or another suitable input device, to analyze at least one piece of emotional state input or information from a user, to compare it with a set of standard emotional state indicators, and to provide the at least one first emotional state based on that information. This information does not come from the actual text that is inputted by the user.

In some embodiments, real-time emoji and emoticon production includes: determining, by the computing device, at least one second emotional state of a user from text inputted by the user on the computing device, wherein the at least one second emotion state is a textually-identified emotional state of the user. In this embodiment, the determining step involves or includes utilizing the keyboard, voice recorder (voice software), or another suitable input device, to analyze at least one piece of emotional state input or information from a user, to compare it with a set of standard emotional state indicators, and to provide the at least one second emotional state based on that information. This information does not come from the visual data that is provided by the user.

Contemplated embodiments include providing an emoji or emoticon production template system, wherein the template system includes at least one physical attribute of the user. A contemplated emoji or emoticon production template system is designed to start with a typical round emoji that is already preconfigured to have the same skin color, face size (round, oval, rectangular, triangular), eye color, and at least one other attribute, such as hair color, hair type, hair-cut, dimples, angular cheeks, tattoos, facial jewelry or embellishments, etc. A contemplated template system is designed to receive input from the computing device regarding the at least one first emotional state based, the at least one second emotional state, or a combination thereof.

A contemplated at least one physical attribute of the user includes a preselected skin color, a preselected face size (round, oval, rectangular, triangular), a preselected eye color, or a combination thereof. A contemplated preselected face size includes round, oval, rectangular, triangular, or a combination thereof. In some contemplated embodiments and methods at least one additional preselected attribute is also included. In some embodiments, the at least one additional preselected attribute, includes a preselected hair color, a preselected hair type, a preselected hair-cut, a preselected dimple, a preselected cheek shape, a preselected tattoo, a preselected facial jewelry or embellishment, or a combination thereof.

A contemplated emoji or emoticon production template system is utilized to: analyze the presently-identified emotional state of the user; determine a suitable map of the presently-identified state of the user; map the presently-identified state of the user, the textually-identified emotional state of the user, or a combination thereof on an emoji or emoticon production template to produce a map or an emoji or emoticon production template map; and produce at least one unique emoji or emoticon based on the map or the emoji or emoticon production template map.

In contemplated embodiments, the at least one unique emoji or emoticon is provided or presented to the user, wherein the user then selects the at least one unique emoji or emoticon and includes the at least one unique emoji or emoticon in a text message, a direct message, an electronic mail message, or a combination thereof. In some embodiments, providing comprises providing at least two unique emoji or emoticon to the user, wherein the user selects one of the at least two unique emoji or emoticon and includes one of the at least two unique emoji or emoticon in a text message, a direct message, an electronic mail message, or a combination thereof. It may be that the map considers an emotional range of the user and produces more than one unique emoji for the user to consider and select.

Contemplated transmission systems and computing devices include communications devices, such as mobile phone applications, computers, tablets, smart phones, watches, glasses, and any other device that incorporates a communications system as part of the device. Contemplated systems improve digital communication by identifying the affective state of the current user. A contemplated computing device comprises at least one portable computing device. Contemplated portable computing devices comprise a phone, a smart phone, a tablet, a laptop computer, a head-engaging device, or a combination thereof. Contemplated head-engaging devices comprise a goggle-type device, a glasses-type device, an ear-engaging device, or a combination thereof.

Figure 4:
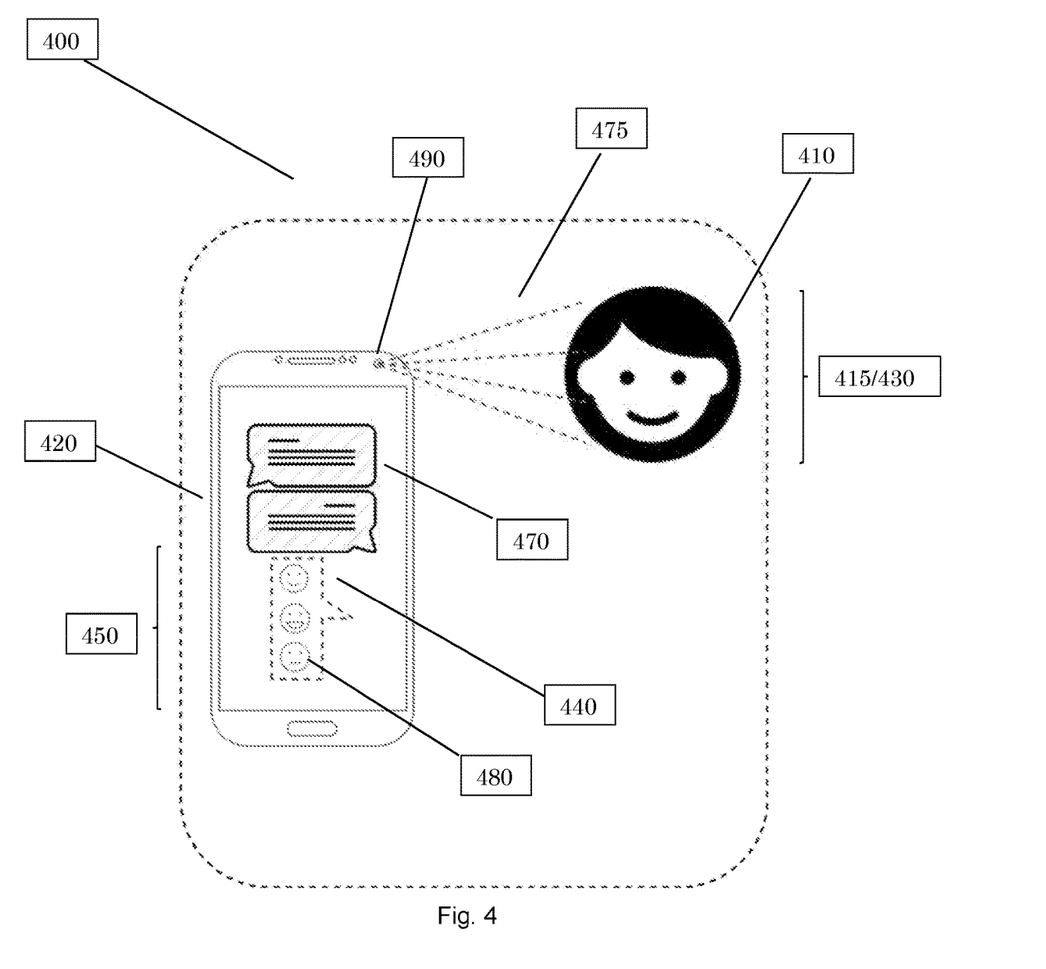
FIG. 4 shows a contemplated embodiment.

FIG. 4 shows a contemplated method 400 of real-time emoji and emoticon production that includes: determining 475, by a computing device 420, at least one first emotional state 415 of a user 410 from information other than text 470 inputted by the user on the computing device 420, wherein the at least one first emotional state 415 is a presently-identified emotional state 430 of the user 410; providing an emoji or emoticon production template system 440, wherein the template system includes at least one physical attribute of the user; and utilizing the emoji or emoticon production template system to: analyze the presently-identified emotional state 430 of the user 410; determine a suitable map of the presently-identified state 430 of the user 410; map the presently-identified state of the user on an emoji or emoticon production template to produce a map; produce at least one unique emoji or emoticon based on the map; provide 450 the at least one unique emoji 480 or emoticon to the user, wherein the user selects the at least one unique emoji or emoticon and includes the at least one unique emoji or emoticon in a text message, a direct message, an electronic mail message, or a combination thereof. In this embodiment, the front camera 490 of the smart phone/computing device is utilized in the determining step to access the user's face and process a digital image of the user's face in order to aid determining the at least one emotional state and to aid analyzing the presently-identified emotional state of the user. It may be understood that the at least one emotional state comprises more than one emotional state, which is blended or analyzed to produce the presently-identified emotional state. It may also be understood that in some embodiments, the at least one emotional state of the user and the presently-identified state of the user are the same or identical to one another.

Several methods exist to extract emotional data from an image. The most common, of which, involves utilizing neural networks and machine learning. A computer program is trained to recognize emotion based on facial action units. For example, happiness would be characterized by action units 6 and 12, raised cheeks and pulled lip corners. Computer "vision" systems are used to recognize these subtle facial expressions based on a large data set of user images. These systems are included as part of a contemplated emoji or emoticon production template system.

Contemplated embodiments include three text messaging tools in a suitable system, such as iMessage, to evaluate the relationship between self-awareness and the effectiveness of communicating emotions via text messaging. The tools use the iMessage's framework in iOS to create app extensions that let users interact with customized features directly within iMessage. The emoji drawings in these tools are from the Emoji One project (emojione.com), which are made available for free with a Creative Commons license. These images are included in the application bundle. A sender chose from a list of emoji by using the control version of the test tool. This version provided a collection of emojis to choose in the way emoji be typically selected from a standard emoji keyboard. The reason of why this control version was developed instead of iOS built-in emoji keyboard was to ensure the uniformity of emojis being used which meant the same set of emojis were adopted for the other two modes. This mode is the first conventional mode now—the one where the device doesn't measure any actual, real-time emotion of the user, but where the user picks his or her own emoji from the list.

In this mode, a sender can see his face at the bottom half of the messaging tool. The sender's facial expression is further analyzed with an affective computing API. The API calculate the current emotion expressed on the sender's face and returns to the tool. Then, this mode will pick up the best emoji from the pool automatically based on the weight of the four emotions (anger, happiness, sadness, surprise) being analyzed and send an emoji to the recipient. This mode is similar to U.S. Pat. No. 9,665,567 mentioned in the background section, in that the emotional state of the user is picked up and analyzed by the device, and the standard emoji are scanned for the best match. The user then picks from the smaller subset of the standard emoji.

A contemplated third mode is the one that is considered herein to be inventive is that an animated emoji is created in real-time based at least in part on the facial expression of the user. The sender's facial landmarks are used to draw the emoji image in real time. Once the user is satisfied with their expressions, a simple tap of the button at the bottom automatically inserts the created emoji into the text message input field as a digital image file, a GIF file, or a combination thereof.

In contemplated embodiments, an animated emoji is played as soon as the loading of the animation file has finished. Utilizing a different format, such as video, would add another barrier for the user and their conversational partner, as both users would then have to start and watch the video thereby introducing unnecessary friction and increased latency to the conversational flow.

Contemplated embodiments utilize computer vision and brings emotion recognition to mobile devices. More specifically, it utilizes the established technology behind emotion recognition as well as smart phone application messaging protocols to build a complete solution.

Contemplated systems and applications utilize smart phone camera input, including the front camera, and video streams to identify the emotion(s) conveyed by the current user. The application divides the video input into individual frames and sends the frames via the network to a server. The server is responsible for decoding emotion.

The response from the server is interpreted accordingly. Several characterizations are built into the application to represent a range of emotions. These characterizations include image files (both animated and static), facial filters, emojis, and animated emojis. Characterizations are then automatically attached to the corresponding text message.

Contemplated systems and applications leverage established technology to provide the affective state to conversational partners. Emotion recognition of individual images is provided by online affective computing service. The communication protocol of the smart phone is provided by APPLE IMESSAGE.

As such, contemplated applications and systems have been described in use in the APPLE IOS operating system, but it is contemplated that any suitable operating system can be used, such as the Android OS that runs on other smart phones, tablets, and portable devices.

EXAMPLES

Example 1: Architecture

Figure 1:
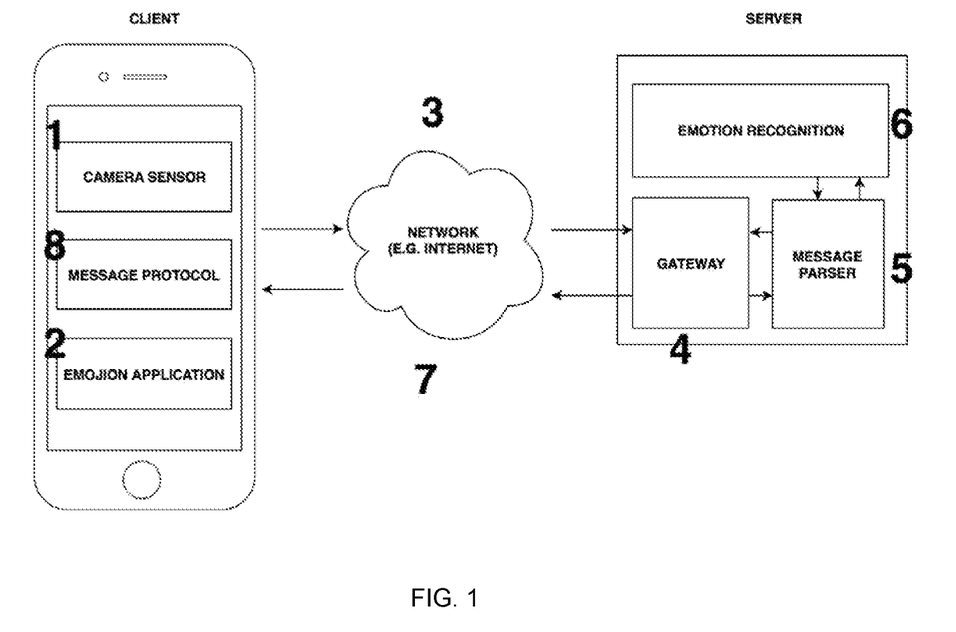
FIG. 1 shows a contemplated embodiment.

FIG. 1 shows a visualization of the architecture for the application. The interaction begins at the camera sensor [1]. User input is captured in the form of a three (3) second video stream. The video stream is automatically initiated in the contemplated application [2]. A stream is divided into individual frames. A total of thirty-five (35) frames are maintained in memory continuously, accounting for roughly three (3) seconds of video. Old frames are discarded as new frames are added, to maintain a constant total of thirty-five (35).

The user initiates the emotion capture process by "tapping" the capture button in the application. The thirty-five (35) frames are sent over the cellular network [3] via individual hypertext transfer protocol (HTTP) requests.

The gateway [4] is responsible for processing the initial HTTP requests. Each valid request is passed through to the next section, the message parser [5]. The message parser is responsible for formatting the captured image data. It is responsible for creating application programming interface (API) requests to the emotion recognition [6] service.

The emotion recognition service is maintained by online affective computing services. However, the application can work with any emotion recognition software, and is not limited to online services. A structured format of available emotions is then received by the message parser.

The server application then responds to the initial HTTP request(s) via the cellular network [7].

Contemplated embodiments interpret the response received from the server and selects the appropriate characterization to represent the emotion identified. The characterization is added to the text message, which is sent via the underlying message protocol (i.e. APPLE IMESSAGE) [8]. This signifies the end of an interaction between the user and the contemplated application. Further interactions repeat the cycle outlined.

Example 2: User Study

Given the importance of emotion in providing conversational context, we expect the way CMC assists a user in selecting an emoji influences emotions exchange between users in CMC. The knowledge that an emotion indicator carries affective information has limited usefulness in understanding CMC unless we know whether the emotion indicator carries the correct affective information [4] [3]. However, CMC is capable of prescribing a compound emotion. We examine both the intended emotion and the perceived emotion at both sending and receiving ends to determine if self-awareness is related with emotion expression in CMC.

In the study, participants were asked to use the instrumented iPhones to send text messages to each other and describe the emotion that they perceive from reading text messages. 3 groups of test subjects (N=12, 4 female, 7 age between 25 and 35, 9 age between 18-25) were recruited to participate in the study. These participants had various undergraduate academic majors, socioeconomic levels, and ethnicities. None of the participants were related to each other. iPhones that ran iOS were provided to each subject in the test. The three different text messaging modes were installed on all of the devices.

The participants were divided into two groups, senders, and recipients. They were not able to see or hear from the other group. A coordinator was assigned to the sender group and the other one was assigned to the recipient group. They communicate to synchronize the test and hand over paper surveys to participants. After being introduced to their seats, the participants were first asked to sign an Informed Consent form. They were next asked to fill up a general survey that collects their demographic information and text messaging history.

Following this, the sender group was asked to use text messaging to describe different scenarios presented to them on paper. Scenarios were counterbalanced across participants. Each scenario was approximately a paragraph long and provided the sender with a situation which they were to imagine just happened to them. The following paragraph is an example.

You are taking a class to learn a new language. A big test is coming up. You studied for it, doing all the study guide questions and reading the books. At nearly midnight the night before the test, you realized that you never finished reading the last chapter of your language book. You lied down to read it, but you fell asleep a third of the way into it. The next morning, you took the test and you did not know the answer to half of the questions. It is now two hours after the test.

Different scenarios were distributed to different senders in each round. After reading a scenario a sender was asked to write down his or her feeling about the scenario with the set of four emotions (anger, happiness, sadness, surprise) on a five-point scale (Survey A). 1 means the emotion should not be presented and 5 means the emotion should be strongly presented in text messages they were going to send. Next, senders described scenario provided to him or her to one of the recipients in the second group via text messages as well as emoji conveying these emotions. Senders were required to finish text messaging a scenario in 5 minutes. Messages were delivered to recipients' iPhones via iOS iMessage. All iPhones connected to the same wireless network. Each of them was assigned a unique iMessage account. After a sender completed a scenario, his or her recipients was asked to determine the levels of intensity for each emotion in their conversation (Survey C). They were given a sheet with each of the four emotions listed and a scale of 1-5 from which they must choose one number for each emotion. Senders were asked to send 2 scenarios by using each of the following modes.

After senders finished all 6 scenarios a paper was provided to each of them to write down all scenarios as accurate as possible followed by the same rating question of emotions before they sent each scenario and the following question (Survey B). Q1. Did you feel you were thoughtful when selecting and sending the emoji with your conversational partner for this scenario? Please rate on a scale of 1 to 5 (where 1 is not thoughtful, and 5 is strongly thoughtful)

Recipients were asked to only answer the following question. Q2. On a scale of 1 to 5 (where 1 is not at all confident, and 5 is very confident), how confident are you that you have correctly identified the emotions received from your conversational partner? (circle one)

Finally, all participants are asked to complete an exit survey which asked for their subjective feedback on this test. The data collected included all text messages sent and received with the timestamp, number of words, and emojis within each message. Privacy was maintained by anonymizing users and by obfuscating of word content. Emoji type, length, and emoji markers were also recorded in these text messages.

Of all participants, only 1 never used emoji in text messaging, the rest used emoji either in each message, in a conversation or on a weekly basis. Senders had a high thoughtfulness of sending messages 4.1 of 5 based on the result of Q1. Recipients showed a high confidence (4.0 of 5) of correctly identifying the emotions from text messages based on the result of Q2.

Figure 2:
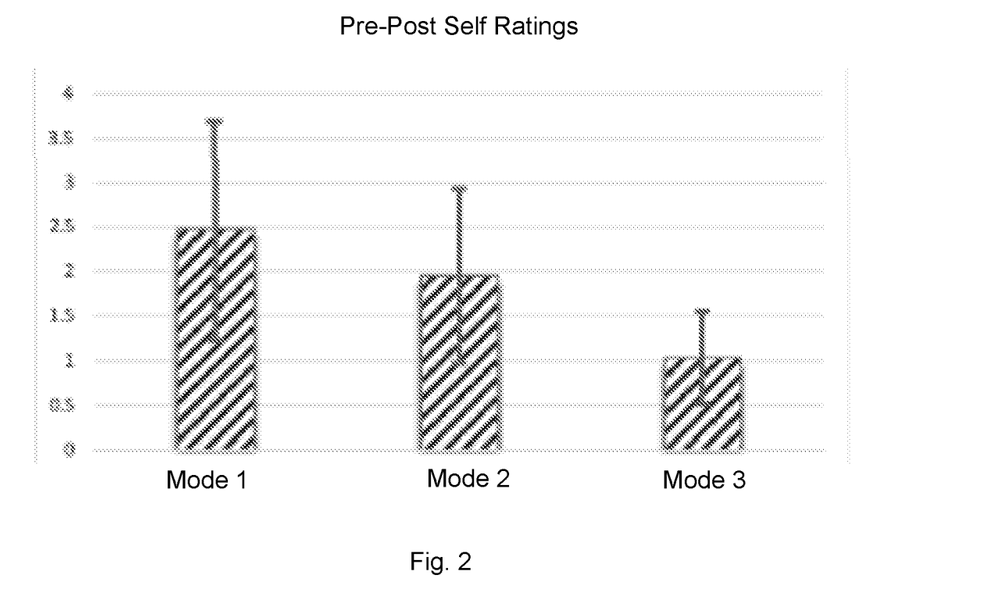
FIG. 2 shows the average difference of the emotion rating in Survey A and Survey B in the 3 different modes.

FIG. 2 shows the average difference of the emotion rating in Survey A and Survey B in the 3 different modes. The difference is measured by:

$$\sqrt{\sum_{i=1}^{4}(e_i^{pre}-e_i^{post})^2}$$

where $i$ = anger, happiness, sadness, surprise.

We can see that the differences are smaller in Mode 2 (1.96) and Mode 3 (0.62) where a sender can see himself or herself comparing to the difference in Mode 1 (2.47). The standard deviation in these two modes are also smaller as 0.98 (Mode 2) and 0.52 (Mode 3). Since a sender was more engaged in Mode 3 than Mode 2, both difference and standard deviation are smaller in Mode 3 than Mode 2. Thus, means self-awareness improves emotion expression. Test subject had a better memory of what emotions they used while texting.

Figure 3:
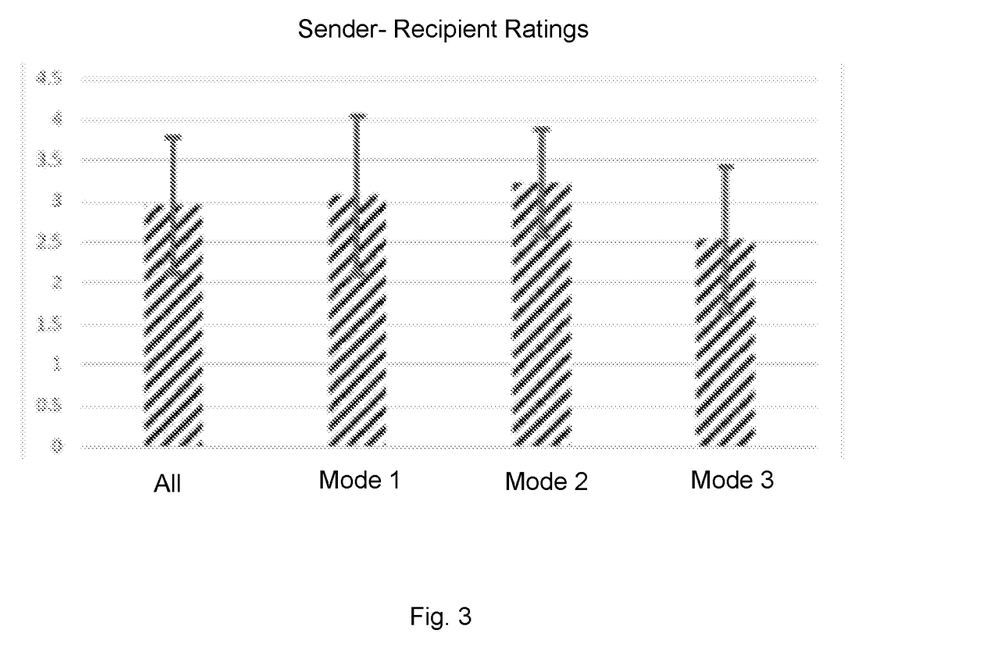
FIG. 3 shows that the difference is smaller when a sender can see himself or herself while adding emojis to their text messages.

We also measured the difference between what a sender thought emotions that he or she conveyed in a scenario and what a recipient actually perceived by using different modes. The difference is:

$$\sqrt{\sum_{i=1}^{4}(e_i^{sender}-e_i^{receipent})^2}$$

where i=anger, happiness, sadness, surprise. The result in FIG. 3 shows that the difference is smaller when a sender can see himself or herself while adding emojis to their text messages. The overall difference of all scenarios was 2.9, and the difference is 2.5 in Mode 3.

Users include emojis in text messaging to carry emotional information, but emotions are not easily delivered out of context. In general, computer-mediated communication needs to include alternative ways to understand a user's behaviors and preferences. Communication tools could utilize techniques that raise self-awareness to balance people's attention and carefulness when using the affective designs. This study compares whether incorporating techniques that increase self-awareness will affect thoughtfulness of expressing emotions between users and correctness of understanding emotions in text messaging. Our results from user study indicate that with a visual reference, people are more thoughtful while using emojis. Moreover, they are more confident that the emojis that they selected will be accurately perceived by their communication partner. Future designs of CMC tools could consider using multiple interactions to increase self-awareness when conveying emotions in text-based electronic communication, such as sending a critical message or crafting social media posts. The multimodal interaction improves senders' level of thoughtfulness and confidence in expressing themselves.

REFERENCES

Each of the below-listed references are the full citations of the references already disclosed herein. It should be noted that each of these references is incorporated herein by reference in its entirety.

[1] David Barton and Carmen Lee. 2013. Language online: Investigating digital texts and practices. Routledge.
[2] Nancy K Baym. 2015. Personal connections in the digital age. John Wiley & Sons.
[3] Yu Chen, Xiaojuan Ma, Alfredo Cerezo, and Pearl Pu. 2014. Empatheticons: Designing emotion awareness tools for group recommenders. In Proceedings of the XV International Conference on Human Computer Interaction. ACM, 16.
[4] Karen Church, Eve Hoggan, and Nuria Oliver. 2010. A study of mobile mood awareness and communication through MobiMood. In Proceedings of the 6th Nordic Conference on Human-Computer Interaction: Extending Boundaries. ACM, 128-137.
[5] Daantje Derks and Arnold B Bakker. 2010. The impact of e-mail communication on organizational life. Cyberpsychology: Journal of Psychosocial Research on Cyberspace 4, 1 (2010).
[6] Shelley Duval and Robert A. Wicklund. 1973. Effects of objective self-awareness on attribution of causality. Journal of Experimental Social Psychology 9, 1 (1973), 17-31. https://doi.org/10.1016/0022-1031(73)90059-0
[7] Valerie Geller and Phillip Shaver. 1976. Cognitive consequences of self-awareness. Journal of Experimental Social Psychology 12, 1 (1976), 99-108.
[8] Alexander Hogenboom, Daniella Bal, Flavius Frasincar, Malissa Bal, Franciska de Jong, and Uzay Kaymak. 2013. Exploiting emoticons in sentiment analysis. In Proceedings of the 28th Annual ACM Symposium on Applied Computing. ACM, 703-710.
[9] Nicolai Marquardt, Ken Hinckley, and Saul Greenberg. 2012. Cross-device interaction via micro-mobility and f-formations. In Proceedings of the 25th annual ACM symposium on User interface software and technology. ACM, 13-22.
[10] Hannah Miller, Jacob Thebault-Spieker, Shuo Chang, Isaac Johnson, Loren Terveen, and Brent Hecht. 2016. Blissfully happyaÄİ or aÄİJready to fightaÄİ: Varying Interpretations of Emoji. Proceedings of ICWSM 2016 (2016).
[11] Margaret E Morris, Qusai Kathawala, Todd K Leen, Ethan E Gorenstein, Farzin Guilak, Michael Labhard, and William Deleeuw. 2010. Mobile therapy: case study evaluations of a cell phone application for emotional self-awareness. Journal of medical Internet research 12, 2 (2010).

[12] Joinson Adam N. [n.d.]. Self-disclosure in computer-mediated communication: The role of self-awareness and visual anonymity. European Journal of Social Psychology 31, 2 ([n.d.]), 177-192. https://doi.org/10.1002/ejsp.36 arXiv:https://onlinelibrary.wiley.com/doi/pdf/10.1002/ejsp.36

[13] W Russell Neuman, Bruce Bimber, and Matthew Hindman. 2011. The Internet and four dimensions of citizenship. The Oxford handbook of American public opinion and the media (2011), 22-42.

[14] Matias Ignatius S. W. Nielsen. 2017. Computer-mediated communication and self-awareness âĂŞ A selective review. Computers in Human Behavior 76 (2017), 554-560. https://doi.org/10.1016/j.chb.2017.08.015

[15] Shuo Niu, Li Liu, and D. Scott McCrickard. 2014. Tongue-able Interfaces: Evaluating Techniques for a Camera Based Tongue Gesture Input System. In Proceedings of the 16th International ACM SIGACCESS Conference on Computers & Accessibility (ASSETS '14). ACM, New York, N.Y., USA, 277-278. https://doi.org/10.1145/2661334.2661395

[16] Nickola C Overall, Garth J O Fletcher, Jeffry A Simpson, and Chris G Sibley. 2009. Regulating partners in intimate relationships: The costs and benefits of different communication strategies. Journal of personality and social psychology 96, 3 (2009), 620.

[17] Charles Sanders Peirce. 1902. Logic as semiotic: The theory of signs. (1902).

[18] Landra Rezabek and John Cochenour. 1998. Visual cues in computer-mediated communication: Supplementing text with emoticons. Journal of Visual Literacy 18, 2 (1998), 201-215.

[19] A Smith and M Anderson. 2018. Social media use in 2018. (2018).

[20] Channary Tauch and Eiman Kanjo. 2016. The roles of emojis in mobile phone notifications. In Proceedings of the 2016 ACM International Joint Conference on Pervasive and Ubiquitous Computing: Adjunct. ACM, 1560-1565.

[21] Jilin Tu, Hai Tao, and Thomas Huang. 2007. Face as mouse through visualface tracking. Computer Vision and Image Understanding 108, 1 (2007), 35-40. https://doi.org/10.1016/j.cviu.2006.11.007 Special Issue on Vision for Human-Computer Interaction.

[22] Francisco Yus. 2018. Cyberpragmatics: Internet-mediated communication in context. John Benjamins Publishing Company.

Thus, specific embodiments, methods of use of the identification of user emotions for a smartphone or other communication device environment have been disclosed. It should be apparent, however, to those skilled in the art that many more modifications besides those already described are possible without departing from the inventive concepts herein. The inventive subject matter, therefore, is not to be restricted except in the spirit of the disclosure herein. Moreover, in interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A method of real-time emoji and emoticon production, comprising:
    determining, by a computing device, at least one first emotional state of a user from a piece of information other than text inputted by the user on the computing device, wherein the piece of information comprises at least one facial landmark of the user, and wherein the at least one first emotional state is a presently-identified emotional state of the user;
    determining, by the computing device, at least one second emotional state of a user from text inputted by the user on the computing device, wherein the at least one second emotional state is a textually-identified emotional state of the user;
    providing an emoji or emoticon production template system, wherein the template system includes at least one physical attribute of the user and wherein the at least one physical attribute of the user includes a preselected skin color, a preselected face size (round, oval, rectangular, triangular), a preselected eye color, or a combination thereof; and
    utilizing the emoji or emoticon production template system to:
        analyze the presently-identified emotional state of the user;
        analyze the textually-identified emotional state of the user;
        determine a suitable map of the presently-identified state of the user using the at least one facial landmark of the user;
        map the presently-identified state of the user on an emoji or emoticon production template to produce a map;
        add the textually-identified emotional state of the user on the emoji or emoticon production template map;
        draw at least two original and unique emoji or emoticon based on the map in real time; and
        provide the at least two original and unique emoji or emoticon to the user, wherein the user selects one of the at least two unique emoji or emoticon and includes one of the at least two original and unique emoji or emoticon in a text message, a direct message, an electronic mail message, or a combination thereof.

2. The method of claim 1, wherein a computing device comprises a portable computing device.

3. The method of claim 2, wherein the portable computing device comprises a phone, a smart phone, a tablet, a laptop computer, a head-engaging device, or a combination thereof.

4. The method of claim 3, wherein the head-engaging device comprises a goggle-type device, a glasses-type device, an ear-engaging device, or a combination thereof.

5. The method of claim 1, wherein the preselected face size includes round, oval, rectangular, triangular, or a combination thereof.

6. The method of claim 1, including at least one additional preselected attribute.

7. The method of claim 6, wherein the at least one additional preselected attribute, includes a preselected hair color, a preselected hair type, a preselected hair-cut, a preselected dimple, a preselected cheek shape, a preselected tattoo, a preselected facial jewelry or embellishment, or a combination thereof.

* * * * *